United States Patent [19]

Stolzer

[11] 4,306,478
[45] Dec. 22, 1981

[54] CONTINUOUSLY OPERATING SEVERING MACHINE

[76] Inventor: Paul Stolzer, Franz-Xaver-Lender-Strasse 16, D-7590 Achern, Fed. Rep. of Germany

[21] Appl. No.: 162,768

[22] Filed: Jun. 25, 1980

[30] Foreign Application Priority Data

Jul. 18, 1979 [DE] Fed. Rep. of Germany ....... 2928956

[51] Int. Cl.³ .................... B23D 47/12; B24B 27/06; B26D 7/26
[52] U.S. Cl. ........................................ 83/464; 83/488; 83/590; 83/629; 83/794; 83/799; 83/801
[58] Field of Search .................... 83/464, 471.2, 488, 83/590, 629, 794, 799–801

[56] References Cited

U.S. PATENT DOCUMENTS 3,991,644  6/1981  Sugimoto .............................. 83/800

Primary Examiner—James M. Meister
Attorney, Agent, or Firm—Spencer & Kaye

[57] ABSTRACT

A severing machine including a feed device for cutting tool arranged to advance continuously to effect cutting of a workpiece, a machine stand with a workpiece supporting table and clamping jaws, and a machine head containing the tool movable relative to the table during cutting. The feed device controls the relative movement of the head in the feed direction and comprises: a ball roller spindle rotatably supported by the stand and provided with outer helical threads, the spindle having a length greater than the maximum feed displacement of the portion of the head in the region of the spindle; two spaced-apart axial bearings carried by the head; a freewheel coupling positioned between the axial bearings and composed of an inner race in threaded engagement with the spindle and having a thread pitch outside of the range of self-locking with the spindle thread, an outer race carried by, and rotatable freely relative to, the inner race, and a coupling mechanism coupling the races together in a manner to permit the outer race to rotate freely relative to the inner race in the direction of rotation of the inner race relative to the spindle during movement of the head in the feed direction, the outer race being driven in that direction of rotation at a rate which is a function of the tool advance; a braked drive motor connected for rotating the spindle; and a unit for adjusting the weight loading by the head on the freewheel coupling.

7 Claims, 3 Drawing Figures

CONTINUOUSLY OPERATING SEVERING MACHINE

BACKGROUND OF THE INVENTION

The invention relates to a continuously working severing machine in the form of a horizontal bandsaw, cold circular saw, severing grinding machine or the like. Such machine is provided with a machine stand forming a workpiece table on which the workpiece rests, and clamping jaws, mounted on the table for clamping the workpiece in position. The machine further includes a machine head articulated pivotably in the feed direction of the tool or vertically displaceably guided on the machine stand and containing the rotating tool. The machine head is pivotable or mobile in the direction towards the workpiece with the aid of a feed device for tool feed motion and to generate the cutting pressure between tool and workpiece, dependent upon the workpiece material and cross section. The feed device is drivable, possibly at high speed, after completion of a working operation into the position for the beginning of the next working operation, the feed device, on the one hand, being supported by the machine stand and, on the other hand, acting upon the machine head.

In such known severing machines, the feed device for the machine head is constituted for example by a cylinder-piston unit acting on the machine head. In dependence upon the workpiece material and maximum workpiece cross section, the cylinder-piston unit is charged with hydraulic pressure so that the tool, as far as possible, exerts the optimum cutting force. Here, however, working conditions vary in the case of a workpiece cross section which as a rule varies in the working direction, which conditions can be compensated only with difficulty by controlling the pressure applied to the cylinder-piston unit. Here, however, large quantities of pressure oil must be pumped around through an adjustable pressure relief valve, which oil correspondingly heats up during working and again leads to falsification of the setting, in that this oil influences the regulating valves and their settings. Furthermore the power necessary for pumping around the pressure oil and the energy absorbed in the form of heating of the pressure oil are uselessly lost. As a whole such a known feed device cannot react in a highly sensitive manner to the conditions prevailing at each moment at the cutting position.

On the other hand mechanical feed devices are also known which work with electronically controlled stepping motors as feed motors, in which case by means of the electronic system attempts are made to satisfy the conditions predetermined by the workpiece in each case. Here again, specifically in the case of workpiece cross sections, which vary in the cutting direction, highly sensitive adaptation is possible only at considerable expense.

SUMMARY OF THE INVENTION

It is an object of the invention, in a continuously operating severing machine of the initially described type, to provide a feed device which operates such that control operations to take account of workpiece cross section variations in the working direction, and of the thus varying cutting conditions, are not necessary or result of their own accord.

A further object of the invention is to provide such a feed device which is uncomplicated and which is simple in comparison with known feed devices.

These and other objects are achieved according to the invention, in a continuously operating severing machine having a cutting tool arranged to advance continuously to effect cutting of a workpiece, a machine stand presenting a workpiece table for supporting the workpiece and clamping jaws for holding the workpiece in position, a machine head containing the cutting tool and movable relative to the workpiece table for advancing the tool in a feed direction through the workpiece during cutting, and a feed device connected between the machine stand and the machine head for controlling the relative movement of the machine head in the feed direction and the cutting pressure between the cutting tool and workpiece in dependence upon the workpiece material and cross section, and for returning the machine head back to its starting position at high speed after a cutting operation, by constituting the feed device of:

a ball roller spindle rotatably supported by the machine stand and provided with a helical thread on its outer surface, the spindle extending in the feed direction and having a length greater than the maximum feed displacement of the portion of the machine head in the region of the spindle;

two axial bearings carried by the machine head in the vicinity of the spindle and spaced apart in the direction of the length of the spindle;

a freewheel coupling positioned between the axial bearings and composed of an inner race in threaded engagement with the spindle and having a thread pitch outside of the range of self-locking with the spindle thread; an outer race carried by, and rotatable freely relative to, the inner race, and a coupling mechanism coupling the races together in a manner to permit the outer race to rotate freely relative to the inner race in the direction of rotation of the inner race relative to the spindle during movement of the machine head in the feed direction;

a drive unit connected for rotating the outer race in the direction of rotation at a rate which is a function of the advance of the tool;

a braked drive motor connected for rotating the spindle in the direction of rotation; and a device for adjusting the weight loading imposed by the machine head on the freewheel coupling.

Such an arrangement according to the invention enables the feed of the tool to take place in each case under the influence of the effective weight of the machine head which is set with regard to the characteristics of the particular workpiece being cut. Under this weight, the free wheel on the ball roller spindle leads in the feed direction, while however apart from the weight of the machine head there are no imposed values as regards the feed. Thus, if at the weight of the machine head set in each case, the cross section of the workpiece, for example, tends to slow the feed of the tool, the inner race of the free wheel coupling correspondingly lags or continues to move correspondingly more slowly, although the outer race of the free wheel driven by the tool would permit a more rapid feed movement. On the other hand, however, the speed of rotation of the free wheel outer race derived from the tool speed limits the maximum speed of rotation of the free wheel inner race and thus the maximum feed of the machine head and therefore of the tool, which is based on the load capacity of the tool.

During this described movement in the feed direction, the spindle is held stationary by the braked motor and is thus connected almost rigidly via the motor housing with the machine stand.

The geometry of the mutually engaging screw threads on the outer surface of the spindle and the inner periphery of the inner race is such that the downward force exerted by the machine head on the coupling, via the axial bearings, causes the inner race to rotate about the spindle and to thus move downwardly therealong. It is this geometry, therefore, which causes the thread pitch of the inner race to be outside of the range of self-locking with the spindle thread.

Then, for the return stroke of the machine head, the ball roller spindle is driven in rotation by the motor in the stated direction, while the tool drive can be shut off or can continue to run. In the latter case the return stroke merely takes place somewhat more slowly.

It has proved expedient, in the case of a vertically displaceable machine head, to arrange the ball roller spindle so that it remains vertical on the machine stand, while in the case of a machine head pivotally articulated to the machine stand the spindle is mounted pivotably on the machine stand. In the latter case the ball roller spindle accompanies the pivoting movement, and the same may apply to the braked motor, depending on how this is connected, possibly indirectly, with the ball roller spindle.

It is also advantageous for the drive of the free wheel outer race to take place through a transmission of infinite ratio adjustability, the drive side of which is connected with the drive of the tool. By means of this transmission with infinite ratio settability it is possible, on the basis of workpiece material, workpiece cross section or the cutting speed, and additionally by hand, to introduce setting values to the transmission ratio setting of the gearing and thus to the rate of rotation of the free wheel outer race desired in relation to the tool drive. Thus the correct feed speed is set by automatic adaptation in a manner which is free from operating errors. Setting on the basis of workpiece cross section could be effected on the basis of the spacing between the clamping jaws gripping the workpiece.

To influence the effective weight of the machine head it can be expedient to support the machine head relative to the machine stand via the piston of a cylinder-piston unit acting in the feed direction of the machine head, and to provide for adjustment of the hydraulic pressure prevailing in that cylinder chamber of the cylinder-piston unit which is remote from the machine head. This possible solution is valid for the cases where the uninfluenced weight of the machine head, necessitated by structural considerations, is sufficient for the maximum occurring cutting force.

For the further cases where the structurally determined weight of the machine head is not sufficient for this purpose, it is advantageous to have the machine head act in the feed direction relative to the machine stand through the piston of a cylinder-piston unit, and to have the hydraulic pressures prevailing in the two cylinder chambers of the cylinder-piston unit adjustable. In this way the structurally determined weight of the machine head can be reduced or increased as desired.

DESCRIPTION OF THE PREFERRED EMBODIMENTS

Figure 1:
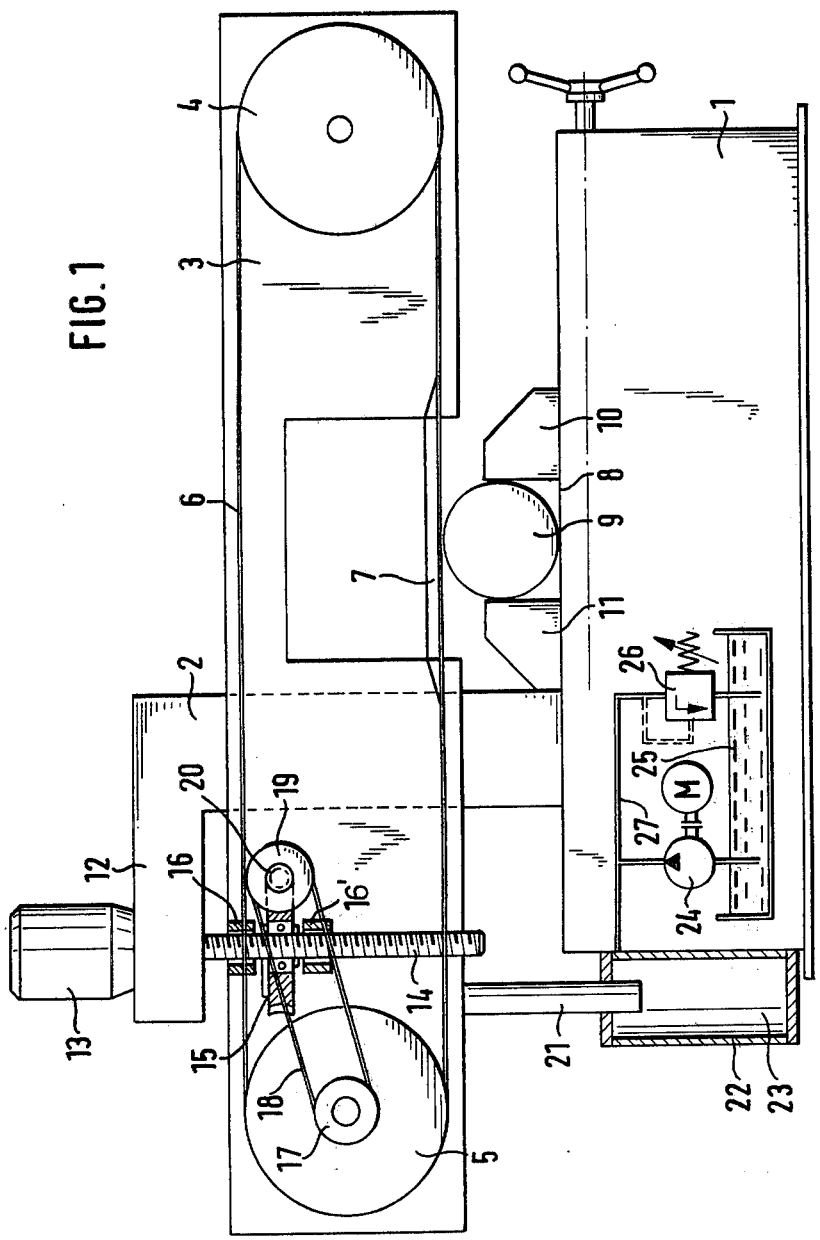
FIG. 1 is a simplified end elevational view of a horizontal bandsaw machine equipped with a feed device according to the invention.

FIG. 1 shows a horizontal bandsaw machine having a machine stand 1 with a vertical guide column 2 on which a machine head 3 is vertically displaceably guided. In the machine head 3 a sawband 6 is guided for travel around return wheels 4 and 5 and is deflected into the vertical cutting plane in the zone 7 by appropriate known guide means.

On a table 8 of the machine stand 1 a workpiece 9 is clamped in for machining by means of clamping jaws 10 and 11.

On the upper part 12 of the guide column 2 there is seated a braked motor 13 which is connected in rotation with a ball roller spindle 14 so that the motor can be controlled to hold this spindle fast or drive it. The machine head 3 is supported on the ball roller spindle 14 through a free wheel 15 which is supported between axial bearings 16 and 16' fixed to the machine head 3, which bearings thus provide support in the axial direction of the ball roller spindle 14 in both directions. The axial bearings are formed to be out of contact with spindle 14 and each axial bearing can include a roller or ball bearing engaging coupling 15 to facilitate rotation thereof.

Figure 3:
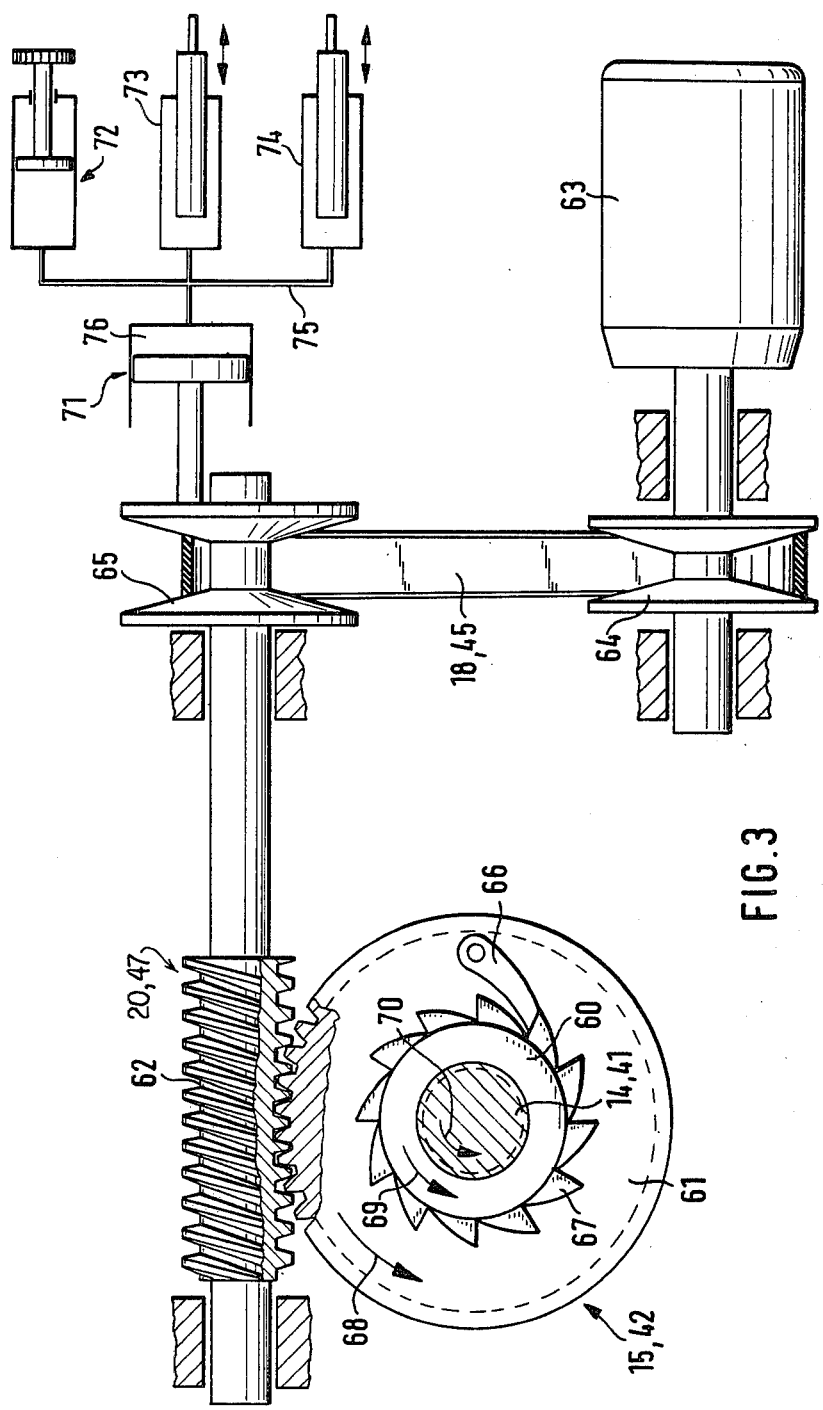
FIG. 3 is a diagrammatically simplified plan view of a preferred embodiment of a feed device according to the invention.

The wheel 5 is driven by a suitable power source, such as motor 63 shown in FIG. 3, to advance sawband 6. Wheel 5 is connected in driving relation with a pulley wheel 17 at the drive side of an infinitely variable transmission having a continuous circulating transmission means in the form of a belt 18 connected therewith. The drive-output side of this transmission is constituted by pulley wheel 19 fixed to a worm 20. The outer portion of wheel 15 is provided around its periphery with gear teeth that engage in worm 20 to form a worm gear.

However, the return wheel 4 can also be driven, which would offer the advantage that in the case of slipping of band 6 on the driven wheel no feed motion of the machine head would take place. The same would be true if band 6 should break.

The machine head 3 is further supported by machine stand 1 via a plunger piston 21 carried by head 3 and a cylinder 22 carried by machine stand 1 and receiving piston 21. This supporting by means of a cylinder-piston unit serves to reduce the effect of the structurally necessary weight of the machine head 3. For this purpose the cylinder chamber 23 of the cylinder 22 can be supplied with pressure medium by means of a pump 24 driven by a motor M, which medium can be drawn from an oil reservoir 25 by the pump. The pressure-medium pressure to be maintained in the cylinder chamber 23 is settable by means of a valve 26 mounted in the conduit 27 through which the pressure medium passes from the pump 24 to the cylinder chamber 23.

Figure 2:
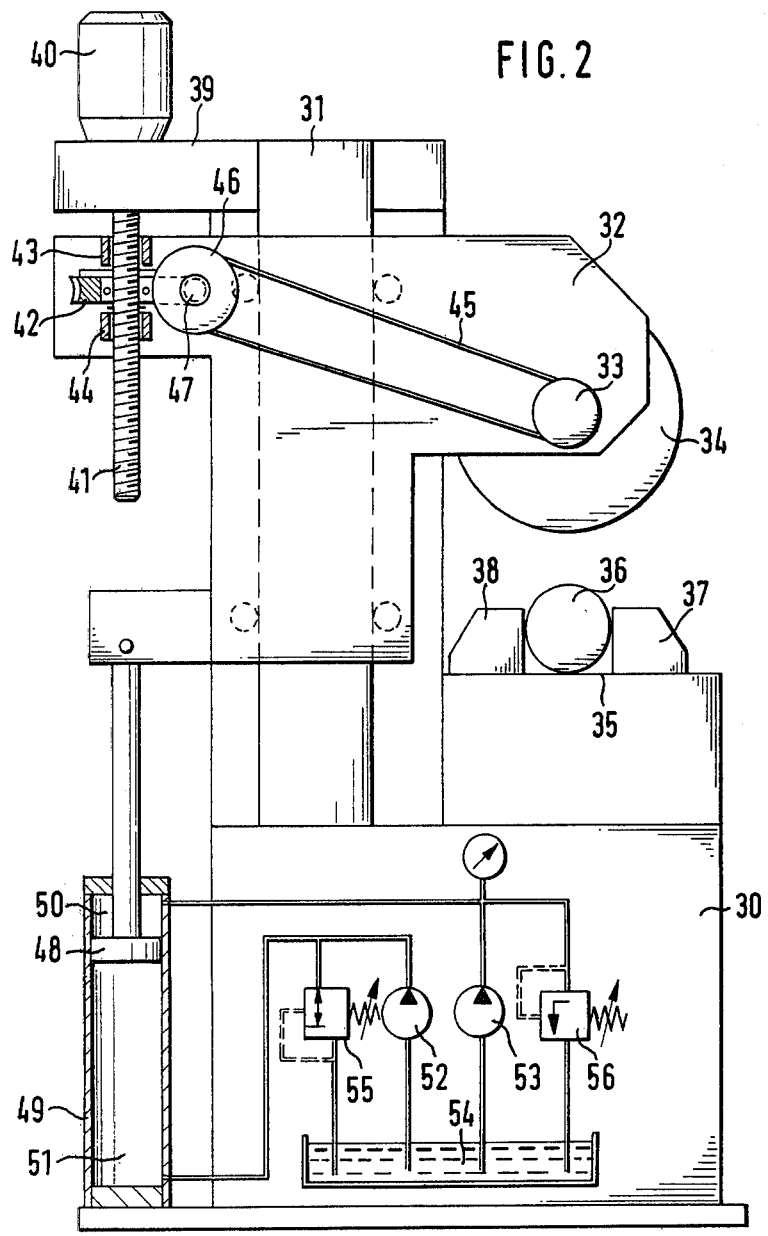
FIG. 2 is a view similar to that of FIG. 1 of a cold circular saw machine equipped with a feed device according to the invention.

The machine shown in FIG. 2 is a cold circular saw machine including a machine stand 30 having a vertical guide column 31 on which a machine head 32 is vertically displaceably guided. The machine head 32 carries a cold circular saw blade 34 which is driven via a pulley wheel 33.

The machine stand 30 includes a machine table 35 for supporting a workpiece 36 to be worked, and clamping jaws 37 and 38 for holding workpiece 36 in place.

A transverse arm 39 of the guide column 31 carries a braked motor 40 which is connected directly with a ball roller spindle 41. The ball roller spindle 41 is surrounded by a free wheel coupling 42 which is supported in both axial directions of the ball roller spindle 41 against the machine head 32 by means of bearings 43 and 44 fixed to head 32.

The drive side of an infinitely variable step-up transmission is connected at pulley wheel 33 with the drive of a tool 34 and its rotating movement passes by way of an endless transmission means 45 to a pulley wheel 46 at the drive-output side of the transmission. Wheel 46 cooperates through a worm 47 with the gear-toothed outer race of the free wheel coupling 42, to thereby form a worm gear.

On the other hand, the machine head 32 is connected with a piston 48 which is vertically displaceable in a cylinder 49 which in turn is supported by the machine frame 30 or by the floor on which the latter is standing. Piston 48 divides the interior of cylinder 49 into cylinder chambers 50 and 51 which are separated by the piston itself and are chargeable separately from one another by pressure-medium pumps 52 and 53 which draw pressure medium from a reservoir tank 54. Adjustable pressure relief valves 55 and 56 serve for the setting of the hydraulic pressure prevailing in the cylinder chambers 50 and 51, respectively. The pressure build-up in the cylinder chamber 51 here serves to reduce the effective weight of the machine head 32, while a pressure build-up in the cylinder chamber 50 serves to increase the effective weight of the machine head 32.

FIG. 3 illustrates the details of the feed device shown in FIGS. 1 and 2, composed of the free wheel coupling 15 or 42 and the components associated therewith. The free wheel coupling is composed of an inner race 60 in threaded engagement with spindle 14, 41 and an outer race 61 freely movable relative to inner race 60 and coupled thereto by a coupling mechanism represented here as a pawl and ratchet mechanism in order to simplify or clarify the following explanations. In fact, by way of example, a grip body free wheel arrangement can be used as the free wheel coupling, and has the property of coupling and uncoupling, even at minimum rotation speed, differences between inner race 60 and free running outer race 61. (Grip body free wheel arrangement is a one-way clutch having tiltable sprags between inner and outer races).

FIG. 3 also shows the ball roller spindle 14 or 41 mentioned already with reference to FIGS. 1 and 2 and the mentioned worm 20 or 42 presenting a helix 62 which meshes with the outer race 61, forming a gear wheel, of the free wheel coupling.

FIG. 3 further shows the already-mentioned tool drive 63 which simultaneously drives blade 3, 6 or 34 and the drive-input side 64 (17,33) of the infinitely variable cone-pulley belt-type transmission. The drive-output side 65 (19,46) of the transmission is connected in rotation with the worm 20, 47 composed of a helix 62. Between the drive-input side 64 and the drive-output side 65 of the cone-pulley belt-type transmission, there circulates the transmission means 18, 45, already indicated in FIGS. 1 and 2.

With reference to the machines as shown in FIGS. 1 and 2, the free wheel 15, 42 represented in greater detail in FIG. 3 works as follows:

In dependence upon the speed of rotation of the tool 6 or 34, the outer race 61 of the free wheel coupling is driven at a specific rotation speed at which the pawl 66, symbolizing the ratchet action of the free wheel, rotates in relation to the teeth 67, symbolized on the inner race 60, in the direction of the arrow 68. To move the cutting tool in the feed direction, spindle 14, 41 is held stationary and the free wheel 15, 42 is urged to travel downwardly on the ball roller spindle 14, 41 under the weight of the machine head 3, 32 or the weight left upon or imparted to this head by the cylinder-piston units 21 to 23 or 48 to 51, the inner race 60 of the free wheel coupling 15, 42 rotating in the direction of the arrow 69.

The last-mentioned rotating movement is however possible only insofar as it does not occur at a greater angular rate than that imparted to the outer race 61 by means of the drive 62. If the inner race 60 tends to rotate faster, the ratchet action of the free wheel coupling mechanism, symbolized by teeth 67 and pawl 66, hinders it from doing so. If, however, the inner race 60 can travel downwards on the ball roller spindle 14, 41 only more slowly due to the cutting resistance between tool and workpiece, then the outer race 61 of the free wheel advances in the direction of the arrow 68, by reason of its continuous drive, without this having any effect upon the feed conditions between tool and workpiece in the machines as described with reference to FIGS. 1 and 2.

In this way the feed of the tool 6, 34 in relation to the workpiece 9, 36 according to FIGS. 1 and 2 is established in a form which permits a specific maximum feed rate, but on the other hand does not impose that feed rate, but can leave this in a completely finely sensitive manner to the cooperation between tool and workpiece.

For the return movement of the machine head 3 or 32 after the completion of a cutting operation, the ball roller spindle 14, 41 is driven in rotation in the direction of the arrow 70 according to FIG. 3 by actuation of the braked motor 13 or 40. The tool 6 or 34 can here continue to rotate, so that the free wheel outer race 61 also continues to rotate, which merely somewhat retards the return stroke of the machine head 3 or 32. In practice however for the return movement of the machine head 3 or 32 by drive of the tool 6 or 34 will best be halted.

FIG. 3 also shows diagrammatically the adjustability of the cone-pulley belt-type transmission 18, 45, 64, 65. This adjustment is effected by a cylinder-piston unit 71 which acts in the direction of an axial displacement upon one of the cone-pulleys at the drive-output side 65. The execution and effect of such an axial displacement in cone-pulley belt-type transmissions are already well known. As shown in FIG. 3, now three possibilities exist for producing the setting distance on the axially displaceable cone-pulley of the drive-output side of the transmission. One of the possibilities is a manual adjustment by delivering a pressure-medium volume through a manually actuated cylinder-piston unit 72. Here for example a correction can be effected with regard to different saw blade tooth types. Another possibility consists in the delivery of pressure medium with the aid of a cylinder-piston unit 73 with which an adaptation can be effected to the speed of rotation of the tool. According to a third possibility, pressure medium is delivered with the aid of a cylinder-piston unit 74 which can be set in dependence upon the distance between the clamping jaws 10, 11 and 37, 38 determined by the width of the workpiece. All three adjustment possibilities act, according to the illustration in FIG. 3, through a conduit 75 upon the cylinder chamber 76 of the cylinder-piston unit 71, and thus influence the distance between the cone-pulleys on the drive-output side 65 of the cone-pulley belt-type transmission.

It will be understood that the above description of the present invention is susceptible to various modifications, changes and adaptations, and the same are intended to be comprehended within the meaning and range of equivalents of the appended claims.

What is claimed is:

1. In a continuously operating severing machine having a cutting tool arranged to advance continuously to effect cutting of a workpiece, a machine stand presenting a workpiece table for supporting the workpiece and clamping jaws for holding the workpiece in position, a machine head containing the cutting tool and movable relative to the workpiece table for advancing the tool in a feed direction through the workpiece during cutting, and a feed device connected between the machine stand the machine head for controlling the relative movement of the machine head in the feed direction and the cutting pressure between the cutting tool and workpiece in dependence upon the workpiece material and cross section, and for returning the machine head back to its starting position at high speed after a cutting operation, the improvement wherein said feed device comprises:

a ball roller spindle rotatably supported by said machine stand and provided with a helical thread on its outer surface, said spindle extending in the feed direction, and having a length greater than the maximum feed displacement of the portion of said machine head in the region of said spindle;

two axial bearings carried by said machine head in the vicinity of said spindle and spaced apart in the direction of the length of said spindle;

a freewheel coupling positioned between said axial bearings and composed of an inner race in threaded engagement with said spindle and having a thread pitch outside of the range of self-locking with said spindle thread; an outer race carried by, and rotatable freely relative to, said inner race, and coupling means coupling said races together in a manner to permit said outer race to rotate freely relative to said inner race in the direction of rotation of said inner race relative to said spindle during movement of said machine head in the feed direction;

drive means connected for rotating said outer race in said direction of rotation at a rate which is a function of the advance of the tool;

a braked drive motor connected for rotating said spindle in said direction of rotation; and means for adjusting the weight loading imposed by said machine head on said freewheel coupling.

2. An arrangement as defined in claim 1 wherein said machine head is mounted on said machine stand to be vertically displaceable and said ball roller spindle is arranged vertically on said machine stand.

3. An arrangement as defined in claim 1 wherein said machine head and said ball roller spindle are pivotally mounted on said machine stand.

4. An arrangement as defined in claim 1 wherein said drive means comprise a transmission having an infinitely variable transmission ratio, and a source of drive power connected to advance said tool and drive said transmission.

5. An arrangement as defined in claim 1 wherein said weight loading adjusting means comprise: a piston-cylinder unit connected between said machine head and said machine stand for applying to said head a force which extends parallel to the feed direction and which is a function of the fluid pressure in said unit; and means connected for adjusting the value of the pressure in said unit.

6. An arrangement as defined in claim 1 wherein said weight loading adjustment means comprise: a double acting piston-cylinder unit connected between said machine head and said machine stand for applying to said head a force extending parallel to the feed direction, said unit including a cylinder and a piston disposed in the cylinder to divide the interior thereof into two chambers separated by said piston, such that the force applied by said unit is a function of the fluid pressures in said chambers; and means connected for adjusting the values of the pressures in said chambers.

7. An arrangement as defined in claim 1 wherein: said machine is a horizontal bandsaw; said cutting tool is an endless saw band; said machine further comprises two return wheels rotatably mounted on said head with said saw band extending around said return wheels, and a source of drive power connected to one of said return wheels for advancing said saw band; and said drive means are connected to be driven by the other one of said return wheels.

* * * * *